United States Patent [19]

Leonard et al.

[11] Patent Number: 5,626,357
[45] Date of Patent: May 6, 1997

[54] PASSENGER AIRBAG MODULE USING AN ESSENTIALLY UNITARY COVER

[75] Inventors: Timothy J. Leonard, Stuttgart, Germany; Joseph L. Ralston; Donald J. Bolieau, both of North Ogden, Utah; Mark Rogers, Roy, Utah; Daniel W. Anderson, South Weber, Utah; Axel W. Kaiser, Vaihingen, Germany

[73] Assignees: Morton International, Inc., Chicago, Ill.; Robert Bosch GmbH, Stuttgart-Feuerbach, Germany

[21] Appl. No.: 538,025

[22] Filed: Oct. 2, 1995

Related U.S. Application Data

[63] Continuation-in-part of Ser. No. 341,677, Nov. 17, 1994, Pat. No. 5,466,000.

[51] Int. Cl.$^6$ ............................................. B60R 21/16
[52] U.S. Cl. ............................... 280/728.3; 280/732
[58] Field of Search .............................. 280/728.3, 732, 280/728.2

[56] References Cited

U.S. PATENT DOCUMENTS

| | | | |
|---|---|---|---|
| 3,799,576 | 3/1974 | Fiala | 280/150 AB |
| 3,837,669 | 9/1974 | Nagazumi et al. | 280/150 AB |
| 4,097,064 | 6/1978 | Ikawa et al. | 280/732 |
| 4,989,896 | 2/1991 | DiSalvo et al. | 280/732 |
| 5,035,444 | 7/1991 | Carter | 280/732 |
| 5,046,758 | 9/1991 | Rafferty et al. | 280/732 |
| 5,060,971 | 10/1991 | Nanbu et al. | 280/728 |
| 5,082,310 | 1/1992 | Bauer | 280/732 |
| 5,108,128 | 4/1992 | Parker et al. | 280/732 |
| 5,154,444 | 10/1992 | Nelson | 280/732 |
| 5,161,819 | 11/1992 | Rhodes, Jr. | 280/728 |
| 5,277,443 | 1/1994 | Grant et al. | 280/732 |
| 5,280,947 | 1/1994 | Cooper | 280/728 B |
| 5,292,151 | 3/1994 | Parker | 280/728 B |
| 5,316,335 | 5/1994 | Gray et al. | 280/728 B |
| 5,421,608 | 6/1995 | Parker et al. | 280/732 |
| 5,447,328 | 9/1995 | Iannazzi et al. | 280/732 |
| 5,451,075 | 9/1995 | Parker et al. | 280/728.3 |
| 5,466,000 | 11/1995 | Leonard et al. | 280/732 |

*Primary Examiner*—Paul N. Dickson
*Attorney, Agent, or Firm*—Parmelee, Bollinger & Bramblett; George W. Rauchfuss, Jr.

[57] ABSTRACT

An essentially unitary airbag cover assembly is provided for concealing an airbag module. The cover has a vehicle panel with a front surface, a foam core and panel substrate with a dropped lip or shelf on a distal end thereof. A deployment door incorporated in the panel is hinged to the panel along one side thereof with at least one of the remaining sides of the door resting in the panel on the dropped lip or shelf of the panel substrate. The deployment door and panel are substantially the same thickness, and the shelf is dropped such that when the deployment door is positioned on the dropped shelf in the panel substrate, the door and panel are on the same level and there is no need for a connection between the panel and deployment door aside from the hinged side of the door.

4 Claims, 2 Drawing Sheets

PASSENGER AIRBAG MODULE USING AN ESSENTIALLY UNITARY COVER

This application is a continuation-in-part of application Ser. No. 08/341,677 filed Nov. 17, 1994, now U.S. Pat. No. 5,466,000.

FIELD OF THE INVENTION

This invention relates to a vehicle airbag assembly, and more particularly to an essentially unitary airbag cover assembly containing a deployment door for a passenger airbag module in a vehicle panel which requires no ripper and/or cutter structure for opening the deployment door by the airbag into a passenger compartment.

BACKGROUND OF THE INVENTION

Airbag restraint assemblies are generally provided with some type of cover assembly which conceals the airbag module of the assembly in an internal portion of the vehicle, e.g., in the passenger instrument panel, door panel, or the like, prior to the deployment of the airbag into the vehicle passenger compartment. The airbag cover assemblies may comprise a panel containing an integral deployment door which is caused to open during the inflation of the hidden airbag, thereby providing a doorway outlet in the panel through which the inflating airbag deploys into the vehicle passenger compartment. The panel normally includes a vinyl outer layer separated by a foam core from a metal or thermoplastic panel substrate. In order to cause the door to open, a tear region which may be delineated by tear seams is usually aligned with a tear means such as a cutter.

In order to cause the deployment door to open, the inflating force of a deploying airbag positioned behind the deployment door drives the tear means through the tear region to separate the deployment door from the rest of the panel. The door is hinged along an edge thereof or tethered to an interior vehicle substrate to prevent the release of the door into the passenger compartment. Otherwise, a released flying door might injure an occupant in the passenger compartment. However, separation of the door from the panel using a cutter means requires the cutter to pass through the foam core and the outer vinyl layer or "skin" which can cause fragmentation resulting in debris being emitted through the open deployment door into the passenger compartment, which is not desirable with respect to passenger safety and comfort.

SUMMARY OF THE INVENTION

Accordingly, it is an object of this invention to provide a new and improved airbag cover assembly for an airbag module mounted in the passenger compartment of a vehicle incorporating a deployment door in a panel, which does not require a connection between the sides of the door and the panel.

Still another object of this invention is to provide a new and improved airbag cover assembly for an airbag module which does not require a tear means and thereby eliminates the debris which would be dispensed into the passenger compartment of a vehicle in using a tear means on the deployment of an airbag.

In carrying out this invention in one illustrative embodiment thereof, an airbag cover assembly is provided having an airbag deployment door incorporated in a vehicle panel for deployment of an airbag from an airbag module positioned behind said panel, said panel comprising a front surface facing an interior of a vehicle compartment, a panel rear surface substrate and a foam core positioned between and separating the front surface from the rear surface substrate. The panel rear surface substrate has a dropped lip or shelf extending from a distal end thereon. A deployment door hinged to the panel along one side of the door is provided with a front surface, a foam core and a rear surface door substrate. The deployment door is positioned in the panel on the dropped lip of the panel substrate such that the deployment door and the aligning portion of the adjacent panel extend side by side at the same level, thereby forming an essentially unitary cover assembly requiring no formal connection between the unhinged sides of the deployment door and the aligning portion of the adjacent panel.

BRIEF DESCRIPTION OF THE DRAWINGS

The invention together with other objects, features, aspects and advantages thereof will be more clearly understood from the following description taken in connection with the accompanying drawings in which like elements will bear the same reference numerals throughout the various views.

DESCRIPTION OF THE PREFERRED EMBODIMENTS

Figure 1:
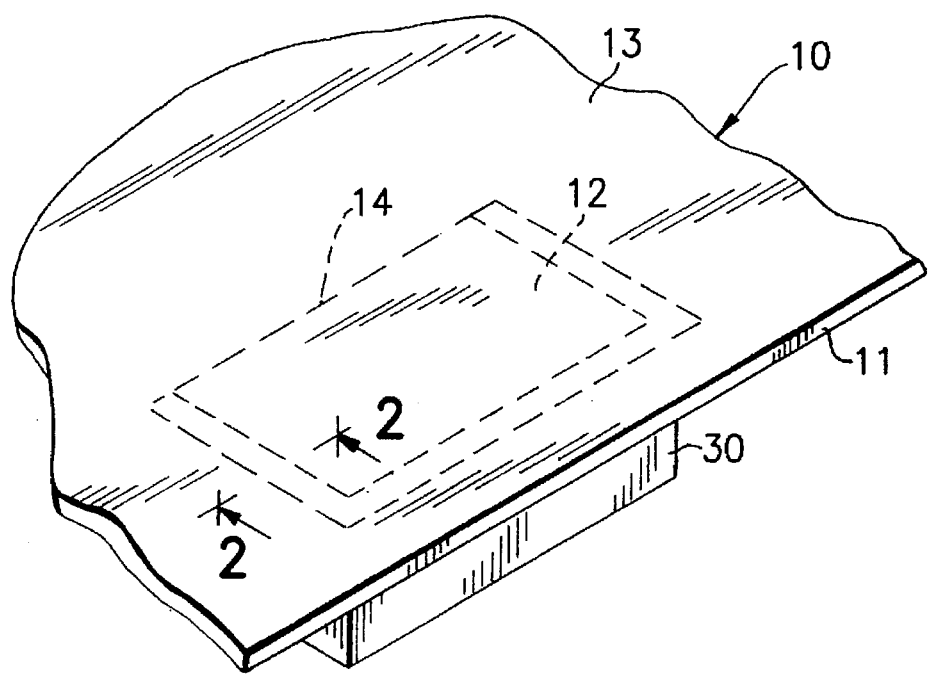
FIG. 1 is a diagrammatic illustration of a top perspective view of a cover assembly in accordance with the present invention.

Referring now to FIG. 1, an airbag cover assembly 10 has a deployment door 12 incorporated therein which is hinged at 14 along one side of the deployment door 12 to the panel 13 in a manner such that when the deployment door 12 is opened, it will remain attached to the panel 13 by the hinge 14. The panel 13 and deployment door 12 are positioned in front of or over an airbag module 30 containing an airbag (not shown) to conceal the airbag module 30 from view. The airbag is used to open the deployment door 12 in the panel 13, thereby allowing the inflating airbag from the module 30 to enter the passenger compartment of a vehicle in which the airbag module 30 is installed.

Figure 2:
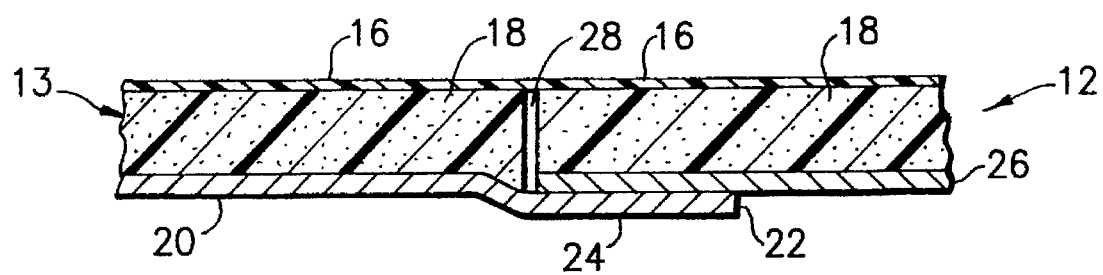
FIG. 2 is a cross-sectional view taken along line 2—2 of FIG. 1.

As will be seen in FIG. 2, the molded panel 13 is comprised of front surface layer 16 of vinyl or other suitable covering, a foam core 18 and a panel substrate 20. The distal end 22 of the panel substrate 20 has a dropped lip or shelf 24 thereon for accommodating the positioning of the deployment door 12 thereon, as will now be described.

The deployment door 12 also has a front surface layer 16 and a foam core 18 completed with a door substrate 26. The panel 13 is formed with a discontinuity or gap 28 between the deployment door 12 and the adjacent portions of panel 13, except at the location of the hinge 14. The discontinuity or gap 28 may be just in the foam core 18 and between the panel substrate 20 and door substrate 26 and this is covered by the front surface layer 16 for appearance purposes if desired. The thickest part of the door 12 is the same thickness as that of the panel 13 such that when the substrate 26 of the door 12 is resting or positioned on the dropped lip or shelf 24 on the distal end 22 of the panel substrate 20, the deployment door 12 and panel 13 are at the same level, thereby forming an essentially unitary cower assembly. The dropped shelf 24 construction eliminates a requirement for a connection between the cover and instrument panel on the unhinged sides of the deployment door 12. As will be seen in FIG. 1, the shelf 24 can extend on three sides of the deployment door 12. In an application where the deployment door 12 extends to coincide with the front edge 11 of the panel 13, the shelf 24 would need to extend only along two sides of the deployment door 12.

Figure 3:
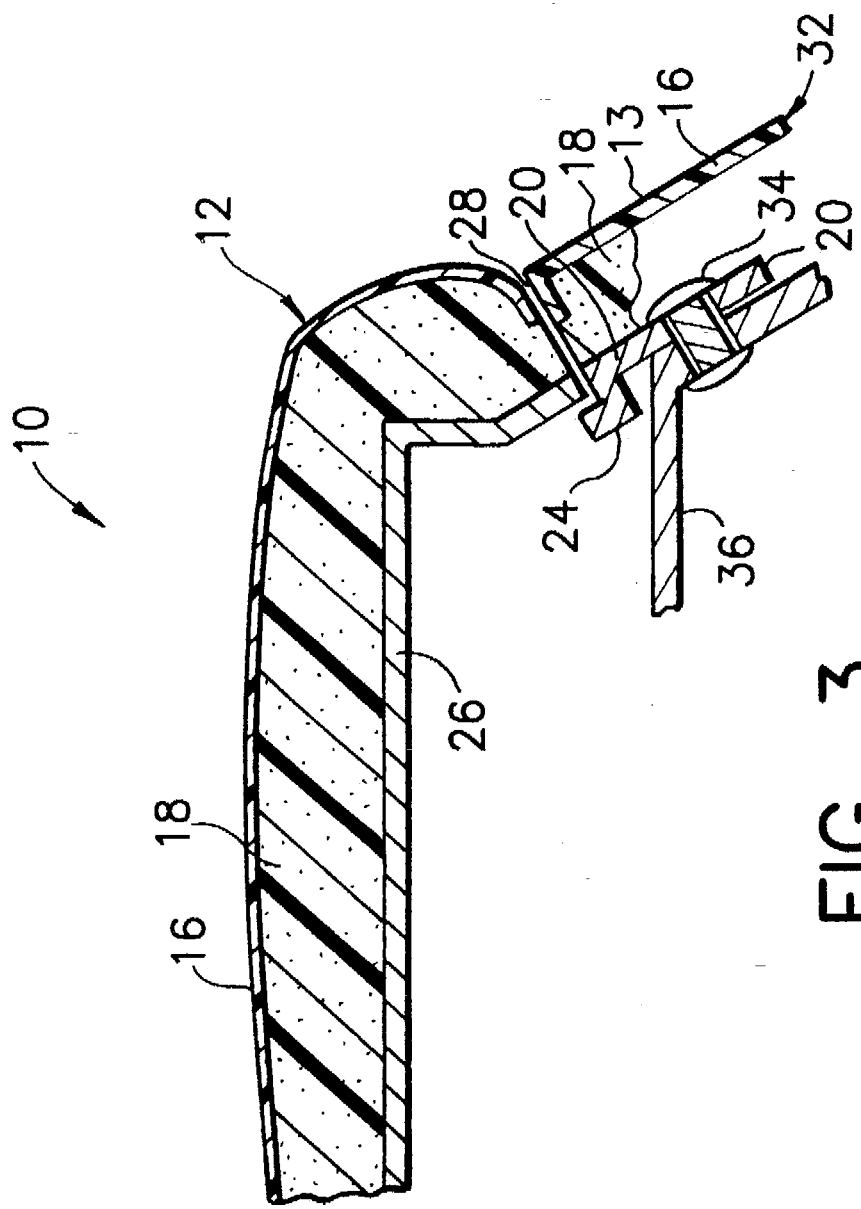
FIG. 3 is a partial cross-sectional view of a cover assembly in accordance with the present invention applied in another embodiment.

In the illustrated airbag cover assembly 10 embodiment shown in FIG. 3, the deployment door 12 is contoured in accordance with the interior of the vehicle in which it is installed. The front surface layer 16 faces the passenger compartment of the vehicle. Only the bottom portion 32 of the panel 13 is shown. The panel 13 is riveted by rivet 34 to the frame 36 or other structure of the vehicle.

Accordingly, an essentially unitary cover assembly is provided with a deployment door incorporated therein for concealing an airbag module. The deployment door rests on the same level as a part of the cover thereby providing an integral appearance. The opening of the deployment door requires no tear seams or cutting structure and eliminates connection of the sides of the door to the cover, save the side of the door which is hinged to the cover.

With the airbag cover assembly of this invention there is no need for a tear means such as a cutter or ripper since there is a discontinuity or gap 28 between the deployment door 12 and the adjacent portions of the panel. Thus, this discontinuity or gap 28 permits the force of an inflating airbag to easily cause the deployment door 12 to separate away from the adjacent portions of the panel 13 along the non-hinged sides of the door. If there is no discontinuity or gap 28 in the front surface layer 16 only this layer need be torn by the force of the inflating airbag. In either event fragmentation and production of undesirable debris is essentially eliminated since no tearing of the substrate or foam core is required.

Since other changes and modifications varied to fit particular operating requirements and environments will be apparent to those skilled in the art, the invention is not considered limited to the examples chosen for purposes of illustration, and includes all changes and modifications which do not constitute a departure from the true spirit and scope of this invention as claimed in the following claims and equivalents thereto.

We claim:

1. An airbag cover assembly having an integral airbag deployment door incorporated in a vehicle panel for deployment of an airbag from an airbag module positioned behind said panel and deployment door, comprising:

a panel front surface facing an interior of a vehicle compartment, a panel rear surface substrate, a foam core positioned between and separating said panel front surface from said panel rear surface substrate, said panel rear surface substrate having a dropped lip extending from an end thereof, a deployment door defined in said panel and hinged along one side thereon in said panel, said deployment door comprises a door front surface, a door rear surface substrate and a foam core positioned between and separating said door front surface from said door rear surface substrate and a complete discontinuity existing between the foam core of the door and the foam core of the adjacent portions of the panel and between the door rear surface substrate and the adjacent portions of the panel rear surface substrate whereby the foam core of the door is completely separated from the foam core of said panel except at the hinged side of the door, said deployment door positioned in said panel on said dropped lip of said panel rear surface substrate whereby said deployment door and adjacent portions of said panel extend side by side at the same level and whereby the deployment door can be opened without ripping any part of said foam cores, thereby preventing foam core debris from being emitted through an open deployment door on deployment of said airbag.

2. The airbag cover assembly according to claim 1 wherein a discontinuity exists between the door front surface and the adjacent portions of the panel front surface except at the hinged side of the door.

3. An airbag cover assembly containing an integral airbag deployment door delineated in a portion of a vehicle panel for deployment of an airbag through said deployment door from an airbag module positioned behind said cover and deployment door, said panel having a front surface, a rear surface panel substrate having a distal end thereon and a foam core positioned between said front surface of said panel and said rear surface panel substrate, a dropped lip extending outwardly from said distal end of said rear surface panel substrate, hinge means mounting said airbag deployment door in said panel along one side of said deployment door with at least two remaining sides of said deployment door resting in alignment with adjacent portions of said panel on said dropped lip of said rear surface panel substrate, said deployment door comprises a door front surface, a door rear surface substrate and a foam core positioned between and separating said door front surface from said door rear surface substrate and a complete discontinuity existing between the foam core of the door and the foam core of the adjacent portions of the panel and between the door rear surface substrate and the adjacent portions of the panel rear surface substrate except at the hinged side of the door whereby the deployment door can be opened without ripping any part of said foam cores, thereby preventing foam core debris from being emitted through the open deployment door on the deployment of said airbag.

4. The airbag cover assembly according to claim 3 wherein a discontinuity exists between the door front surface and the adjacent portions of the panel front surface except at the hinged side of the door.

\* \* \* \* \*